United States Patent [19]

Brännström

[11] Patent Number: 5,400,725

[45] Date of Patent: Mar. 28, 1995

[54] METHOD AND DEVICE FOR FEEDING PARTICULATE MAATERIAL INTO A PRESSURIZED CONTAINER

[75] Inventor: Roine Brännström, Finspong, Sweden

[73] Assignee: ABB Carbon AB, Finspong, Sweden

[21] Appl. No.: 26,691

[22] Filed: Mar. 4, 1993

[30] Foreign Application Priority Data

Mar. 6, 1992 [SE] Sweden .................... 9200696

[51] Int. Cl.6 ............................................... F23G 5/00
[52] U.S. Cl. ......................... 110/245; 110/106; 110/347; 110/263
[58] Field of Search .............. 110/245, 263, 106, 347; 432/14, 58, 106

[56] References Cited

U.S. PATENT DOCUMENTS

| | | | |
|---|---|---|---|
| 3,951,081 | 4/1976 | Martin et al. | 110/106 |
| 4,092,094 | 5/1978 | Lingl, Jr. | 110/106 |
| 4,349,331 | 9/1982 | Floter | 110/106 |
| 4,392,438 | 7/1983 | Dooley | 110/104 R |
| 4,397,248 | 8/1983 | Mehta et al. | 110/106 |
| 4,530,290 | 7/1985 | Comparato | 110/245 |
| 4,690,076 | 9/1987 | Peletz, Jr. et al. | 110/347 |
| 5,175,943 | 1/1993 | Eastham et al. | 110/106 |

FOREIGN PATENT DOCUMENTS

| | | |
|---|---|---|
| 2096386 | 2/1972 | France . |
| 3130602 | 3/1987 | Germany . |
| 3619141 | 12/1987 | Germany . |
| 15620 | 1/1901 | Sweden . |

Primary Examiner—Henry C. Yuen
Attorney, Agent, or Firm—Pollock, Vande Sande & Priddy

[57] ABSTRACT

A method of feeding particulate material into a pressurized fluidized bed combustor including the steps of: feeding the particulate material from a source which is at a substantially lower pressure than that existing in the pressurized fluidized bed combustor into the upper end of an elongate, generally vertical gravity feed conduit constructed to have an inner bore which is substantially smaller at its lower end than at its upper end, and selecting the vertical height of the feed conduit and the extent of reduction in its bore over its length to ensure that the particulate material will move by gravity between the open input end of the conduit and the pressurized fluidized bed combustor notwithstanding the difference in pressure between the pressurized combustor and at the input end of the conduit.

14 Claims, 1 Drawing Sheet

METHOD AND DEVICE FOR FEEDING PARTICULATE MAATERIAL INTO A PRESSURIZED CONTAINER

TECHNICAL FIELD

The present invention relates to a method and equipment for feeding particulate material into a pressurized container. Preferably, the particulate material is fed from a container which is arranged at a lower pressure, for example from a container at atmospheric pressure, into a pressurized container. The invention primarily relates to the feeding of particulate fuel and/or particulate bed material to a combustor arranged in the form of a fluidized bed.

BACKGROUND OF THE INVENTION

The feeding and handling of particulate material, in the form of bed material and fuel, which is supplied to a combustor, in the form of a pressurized fluidized bed, present difficult problems and are achieved with present-day technique by mixing the particulate material with water and pumping in the material in the form of a paste, or by pneumatic transport of particulate material. In the latter case, according to known technique, a feeding system in the form of a locking system is used, which comprises valves and intermediate containers, a so-called lock-hopper system.

In a PFBC (Pressurized Fluidized Bed Combustion) power plant the fluidized bed may operate at a pressure of the order of magnitude of 20 bar, and therefore a feeding system comprising valves is exposed to great stresses resulting in a rapid deterioration of the sealing capacity of the valves. The service life becomes short and the maintenance costs become high.

SUMMARY OF THE INVENTION

One object of the invention is to provide a simplified feeding system without valves and with low service requirement for feeding of particulate material into a pressurized container. One further object of the invention is to provide a feeding system with an even flow of material.

Accordingly, the invention relates to a method and a device for feeding particulate material into a pressurized container wherein the material is adapted to be transferred from a container arranged at a lower pressure to a pressurized container. According to the invention, this is achieved in a simplified way by feeding the particulate material into the pressurized container via a preferably vertical pipe with a large length/diameter ratio. This pipe is adapted to interconnect the containers and the length/diameter ratio of the pipe is adapted according to the invention such that a material column is built up in the pipe, whereby the pressure drop across the material column maintains the pressure difference between the containers while at the same time a leakage flow of gas flows through the material column. The leakage flow is adapted such that the transport of particulate material is directed downwards into the pressurized container.

In one embodiment of the invention, the length/diameter ratio of the above-mentioned pipe is adapted to be between 50 and 100.

To avoid fluidization of the particulate material in the container arranged at a lower pressure, in a further embodiment of this invention the lower part of this container is arranged with a downwardly decreasing cross-section area. Preferably, the lower part of this container is arranged in the form of one or more cone-shaped sections with intermediate cylindrical sections. To avoid dusting when filling this container, a fan is arranged to create a sub-atmospheric pressure in the container in relation to the surroundings, this fan suitably being combined with a filtering device.

According to a further embodiment of the invention, the pressurized container is adapted to comprise
  at least one dispensing device, preferably in the form of a rotary feeder, the dispensing device being adapted to supply a pressurized combustor with particulate material through at least one feed conduit, and
  an inlet part adapted to distribute particulate material to the dispensing device.

BRIEF DESCRIPTION OF THE DRAWING

The invention will be described in more detail in the following with reference to the accompanying figures in which.

DESCRIPTION OF THE PREFERRED EMBODIMENTS

Figure 1:
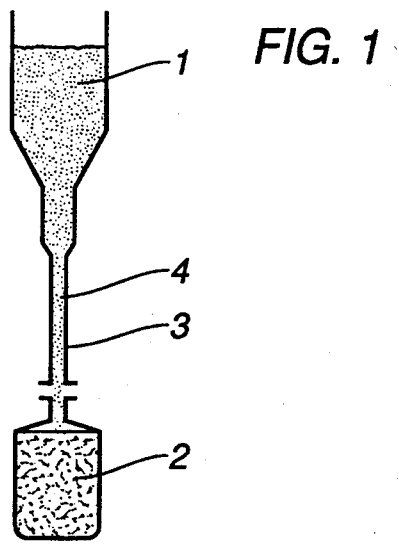
FIG. 1 shows the feeding of particulate material into a pressurized container according to the present invention.

The feeding of particulate material into a pressurized container according to the invention is shown in FIG. 1. Particulate material is transferred from a container 1, arranged at a lower pressure, to the pressurized container 2 by feeding particulate material into the pressurized container 2 via a preferably vertical pipe 3 with a large length/diameter ratio. The containers 1, 2 are inter-connected by the vertical pipe 3 which is arranged with a length/diameter ratio adapted such that a column 4 of material is built up in the pipe 3. The pressure drop which then arises across the material column 4 maintains the pressure difference between the containers 1, 2 while at the same time a leakage flow of gas flows through the material column 4. The leakage flow is adapted so as not to fluidize the particulate material in the container 1 while at the same time the transport of particulate material into the pressurized container 2 is maintained through the pipe 3. The leakage flow of gas through the material column 4 is adapted by varying the grain size distribution of the particulate material as well as the length/diameter ratio of the pipe 3, and the like.

Figure 2:
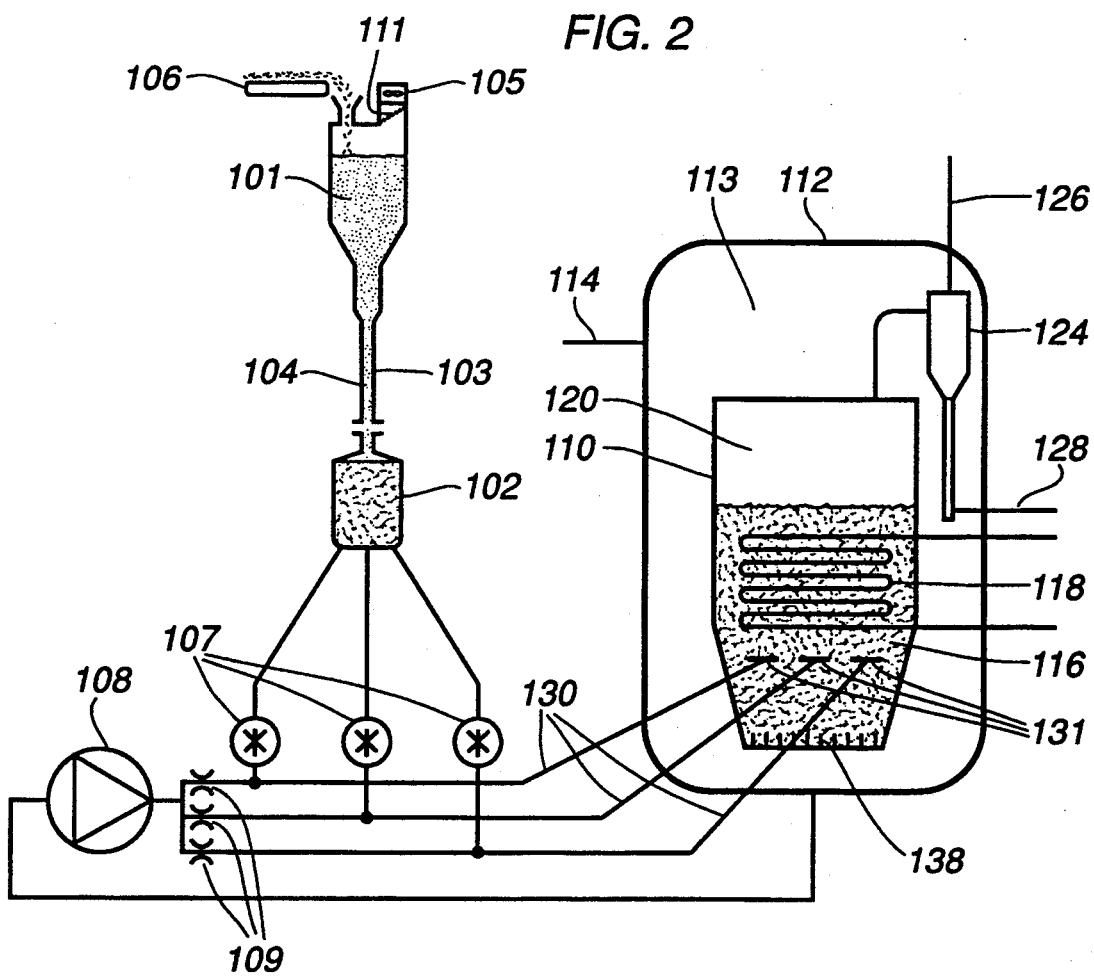
FIG. 2 shows the invention applied to the feeding of particulate fuel and/or bed material in a plant for combustion in a pressurized fluidized bed.

To avoid fluidization of the particulate material in the container 1 arranged at a lower pressure, the lower part of the container 1 is formed with a downwardly-decreasing cross-section area. Preferably, the lower part of the container 1 is arranged in the form of one or more cone-shaped sections with intermediate cylindrical sections. To avoid dusting when filling the container 1, as shown in FIG. 2 a fan 105 can be arranged to create a sub-atmospheric pressure in the container in relation to the surroundings. The fan is suitably supplemented by a filtering device 111. Particulate material is supplied to the container 1 arranged at a lower pressure by means of known technique, in FIG. 2 exemplified by a conveyor belt 106. Particulate material can be continuously supplied to the container 1 arranged at a lower pressure, or be controlled by means of a level relay provided in the container to prevent the container 1 from being emptied of material.

FIG. 2 schematically shows the present invention as applied to the feeding of particulate fuel and/or bed material into a combustor included in a PFBC (Pressurized Fluidized Bed Combustion) power plant, where the combustion takes place at a pressure considerably exceeding the atmospheric pressure, preferably at a pressure of 10–20 bar. In FIG. 2, a combustor 110 is placed inside a pressure vessel 112. The space 113 is supplied with compressed combustion air from a compressor (not shown) via the conduit 114. The combustor 110 contains a fluidizable bed of particulate material 116, in which a fuel is burnt. The combustor 110 also includes tubes 118 for generating steam for a steam turbine (not shown) and for cooling the bed 116. Combustion gases leaving the bed 116 are collected in the freeboard 120, are passed in the conduit 122 to a cleaning plant 124, symbolized by a cyclone 124, where dust is separated. The combustion gases are passed further from the cyclone 124 via a conduit 126 to a gas turbine (not shown). Separated dust is discharged from the cyclone 124 via the conduit 128 to an ash discharge and pressure-reducing system. The combustor 110 is supplied with air from the space 113 via nozzles 138 for fluidization of the material in the bed 116 and combustion of fuel supplied to the bed. Particulate fuel and bed material, which are supplied to the combustor 110 through pneumatic transport conduits 130 and nozzles 131, are fed into the plant while utilizing the present invention, whereby particulate material is supplied to the container 101, arranged at atmospheric pressure, by means of known technique, in the figure exemplified by a conveyor belt 106. Particulate material can be continuously supplied to the atmospheric container 101 or be controlled by means of a level monitor, provided in the container 101, to prevent the container 101 from being emptied of material. To prevent dusting when filling the container 101, a fan 105 is arranged to create a sub-atmospheric pressure in the container relative to the environment. The fan is suitably supplemented by a filtering device 111. The particulate material is transferred from the atmospheric container 101 to a pressurized container 102 via a long, preferably vertical pipe 103 with a length/diameter ratio of between 50 and 100. The pipe 103 interconnects the containers 101, 102 and the length/diameter ratio is adapted such that a material column 104 is built up. The pressure drop thus arising across the material column 104 maintains the pressure difference between the containers 101, 102 while at the same time a leakage flow of gas flows upwards through the material column 104. The leakage flow is adapted such that the transport of particulate material through the pipe 103 is directed downwards into the pressurized container 102. The pressurized container 102 is designed to distribute particulate material between rotary feeders 107, which are adapted to control the supply of particulate material to the pressurized combustor 110 through the pneumatic feed conduits 130. The pneumatic transport conduits 130 are supplied with transport gas which is extracted from the space 113, is pressurized further in the compressor 108, and is distributed individually between the transport conduits 130 through the throttle means 109. The transport gas in the feed conduits 130 may also be pressurized air, which is used for combustion in the fluidized bed of supplied fuel, but may also be other gases or gas mixtures. Inert transport gas is required for feeding reaction-prone, for example easily ignited, powder materials.

I claim:

1. A method of feeding particulate material into a pressurized fluidized bed combustor including the steps of:

feeding said particulate material from a source thereof which is at a substantially lower pressure than that existing in said pressurized fluidized bed combustor into the upper end of an elongate, generally vertical gravity feed conduit constructed to have an inner bore which is substantially smaller at its lower end than at its upper end, and selecting the vertical height of said feed conduit and the extent of reduction in its bore over its length to ensure that said particulate material will move by gravity between the open input end of said conduit and said pressurized fluidized bed combustor notwithstanding the difference in pressure between said pressurized fluidized bed combustor and the pressure at the input end of said conduit.

2. The method according to claim 1, wherein the source of said particulate material is at atmospheric pressure.

3. A method of feeding particulate material into a pressurized fluidized bed combustor including the steps of:

feeding said particulate material from a source thereof which is at a substantially lower pressure than that existing in said pressurized fluidized bed combustor into the upper end of an elongate, generally vertical gravity feed conduit constructed to have an inner bore which is substantially smaller at its lower end than at its upper end, conducting said particulate material from the lower end of said feed conduit to said pressurized fluidized bed combustor, and selecting both the vertical height of said feed conduit and the extent of reduction in its bore between its upper and lower ends to be of sufficient magnitude to ensure that (a) said particulate material will move by gravity between the open input end of said conduit and said pressurized fluidized bed combustor, notwithstanding the difference in pressure between said pressurized fluidized bed combustor and the pressure at the input end of said feed conduit, and that (b) the particulate material will not become fluidized at the upper end of said feed conduit.

4. The method according to claim 3, wherein the source of said particulate material is at atmospheric pressure.

5. A method according to claim 3, wherein said particulate material is being conducted from the lower end of said feed conduit to said pressurized fluidized bed combustor through a pressurized container.

6. A method according to claim 1, wherein said feed conduit includes at least one cone-shaped section alternating with intermediate substantially cylindrical sections.

7. Apparatus for the feeding of particulate material into a pressurized fluidized bed combustor comprising:

a generally upright elongate gravity feed conduit defining an inlet opening communicating with atmospheric pressure and adapted for the inputting of particulate material at its upper end, said feed conduit having an inner bore which converges to be substantially smaller at its lower end than at its upper end;

said feed conduit defining a flow path for the particulate material which extends over a vertical distance of sufficient height and of sufficient convergence to ensure that the particulate material (a) flows by gravity between the open input end of said feed conduit and the lower end of said feed conduit notwithstanding the difference in pressure between said pressurized fluidized bed combustor and the pressure at the input end of said feed conduit and (b) the particulate material will not become fluidized at the upper end of said feed conduit, and means for conveying the particulate material from the outlet end of said feed conduit to the interior of the pressurized fluidized bed combustor.

8. Apparatus according to claim 7, wherein said feed conduit includes at least one cone-shaped section alternating with intermediate cylindrical sections.

9. Apparatus according to claim 7, wherein said means for conveying includes a pressurized container connected to the outlet end of said feed conduit.

10. Apparatus according to claim 7, wherein said feed conduit includes in order from its upper inlet: a first cylindrical portion defining said inlet opening at an upper end, at least one downwardly extending section of decreasing cross-sectional area and a second cylindrical portion defining an outlet at a lower end thereof.

11. The apparatus of claim 7, wherein said particulate material is fed into said inlet opening from a source of said particulate material which is at atmospheric pressure.

12. Apparatus according to claim 9, wherein said pressurized container is connected to at least one dispensing device, said dispensing device receiving said particulate material and controlling the supply of particulate material through feeding conduits to the pressurized fluidized bed combustor.

13. Apparatus according to claim 7, wherein said feed conduit at its input end is connected to means for creating a sub-atmospheric pressure in said feed conduit with respect to the surroundings.

14. Apparatus according to claim 10, wherein said second cylindrical section is a pipe having the length-to-diameter ratio in the range of 50 to 100.

* * * * *